United States Patent [19]

Haupt

[11] Patent Number: 5,020,224
[45] Date of Patent: Jun. 4, 1991

[54] SEMI-AUTOMATIC STRING TRIMMER HEAD

[75] Inventor: Eugene J. Haupt, Nipomo, Calif.

[73] Assignee: White Consolidated Industries, Inc., Cleveland, Ohio

[21] Appl. No.: 518,962

[22] Filed: May 4, 1990

Related U.S. Application Data

[63] Continuation of Ser. No. 222,652, Jul. 21, 1988, Pat. No. 4,926,557.

[51] Int. Cl.$^5$ .................. B26B 7/00; A01D 50/00
[52] U.S. Cl. .................. 30/276; 30/347
[58] Field of Search .................. 30/276, 347; 56/12.7

[56] References Cited

U.S. PATENT DOCUMENTS

| 3,729,078 | 4/1973 | Kincaid et al. | 192/105 CP |
| 4,104,796 | 8/1978 | Sheldon | 30/276 |
| 4,151,646 | 5/1979 | Lane | 30/276 |
| 4,169,311 | 10/1979 | Evenson | 30/276 |
| 4,176,508 | 12/1979 | Baumann et al. | 56/12.7 |
| 4,203,212 | 5/1980 | Proulx | 30/276 |
| 4,236,312 | 12/1980 | Foster et al. | 30/276 |
| 4,245,454 | 1/1981 | Zien | 56/12.7 |
| 4,254,550 | 3/1981 | Satoh | 30/276 |
| 4,285,127 | 8/1981 | Zerrer et al. | 30/276 |
| 4,290,200 | 9/1981 | Lombard | 30/276 |
| 4,310,970 | 1/1982 | Evenson | 30/276 |
| 4,335,510 | 6/1982 | Close et al. | 30/276 |
| 4,347,666 | 9/1982 | Moore | 30/276 |
| 4,352,243 | 10/1982 | Lombard | 30/276 |
| 4,366,621 | 1/1983 | Mitchell | 30/276 |
| 4,366,622 | 1/1983 | Lombard | 30/276 |
| 4,411,069 | 10/1983 | Close et al. | 30/276 |
| 4,426,780 | 1/1984 | Foster | 30/276 |
| 4,483,069 | 11/1984 | Moore | 30/276 |
| 4,493,151 | 1/1985 | Mitchell | 30/276 |
| 4,524,515 | 6/1985 | Oberg | 30/276 |
| 4,566,189 | 1/1986 | Muto | 30/276 |
| 4,599,796 | 7/1986 | Baba | 30/276 |
| 4,607,431 | 8/1986 | Gay | 30/276 |
| 4,651,421 | 3/1987 | Zerrer | 30/347 |
| 4,660,286 | 4/1987 | Engelbrecht et al. | 30/276 |
| 4,667,410 | 5/1987 | Weid et al. | 30/347 |
| 4,817,288 | 4/1989 | Hirose et al. | 30/276 |

FOREIGN PATENT DOCUMENTS 2828425 10/1980 Fed. Rep. of Germany.

Primary Examiner—Douglas D. Watts
Attorney, Agent, or Firm—Hubbard, Thurman, Tucker & Harris

[57] ABSTRACT

A string trimmer providing an incremental indexing of line when the head is stopped and started. The preferred embodiment of the string trimmer head includes a spool member within the body member, the spool member being coaxially positioned within the body member and being rotatable therewith. The spool member includes a grooved end face with a cam channel having at least one switchback and one arcuate segment. A connecting means attached to the body member includes a connector which runs within the cam channel. Upon starting the rotation, the connector runs along an arcuate segment of the cam channel (permitting relative rotation between the spool member and the body member thereby indexing a length of line) until contacting a switchback stopping point. The connector is biased to move along the switchback and resets along the switchback upon stopping of rotation.

4 Claims, 4 Drawing Sheets

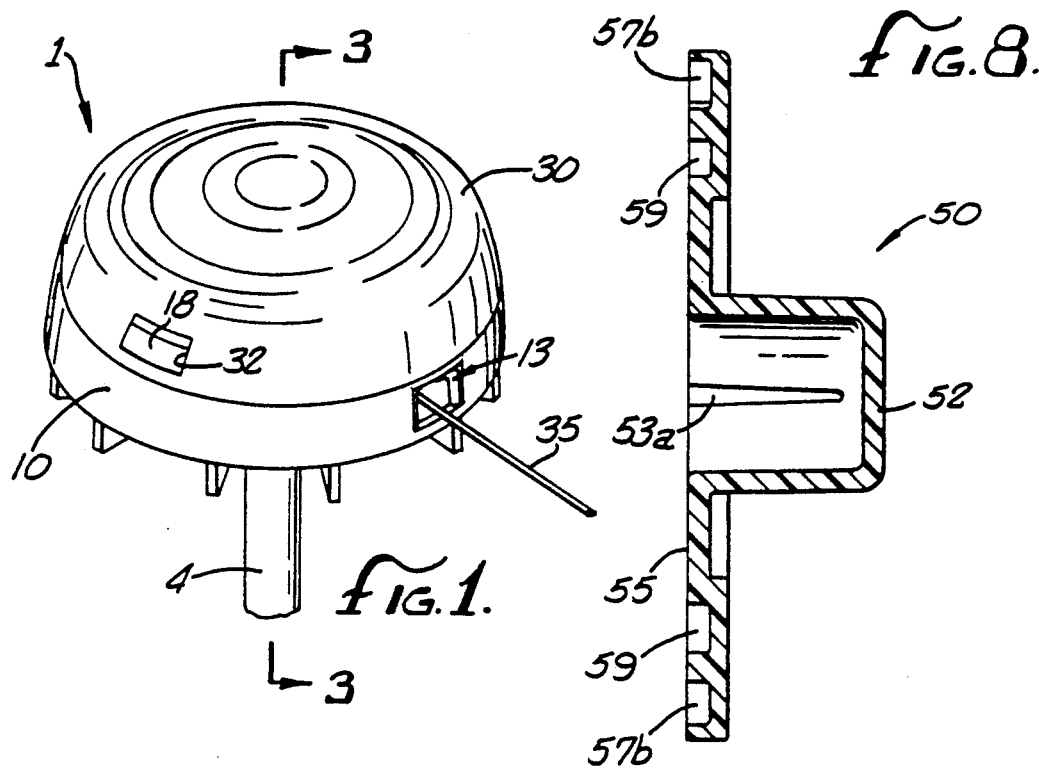
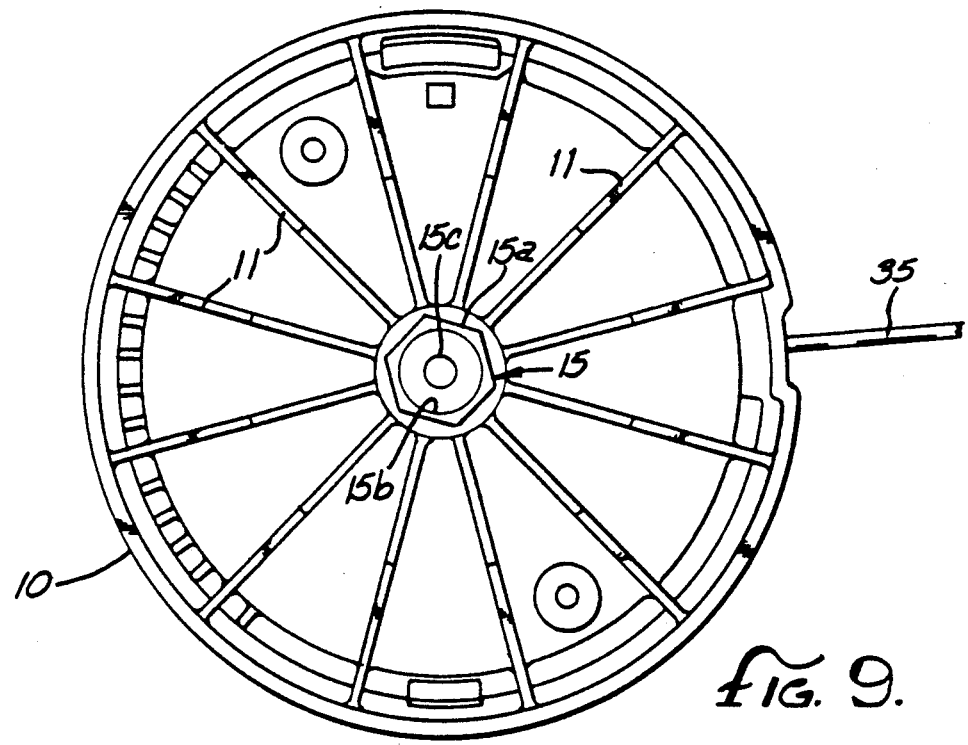

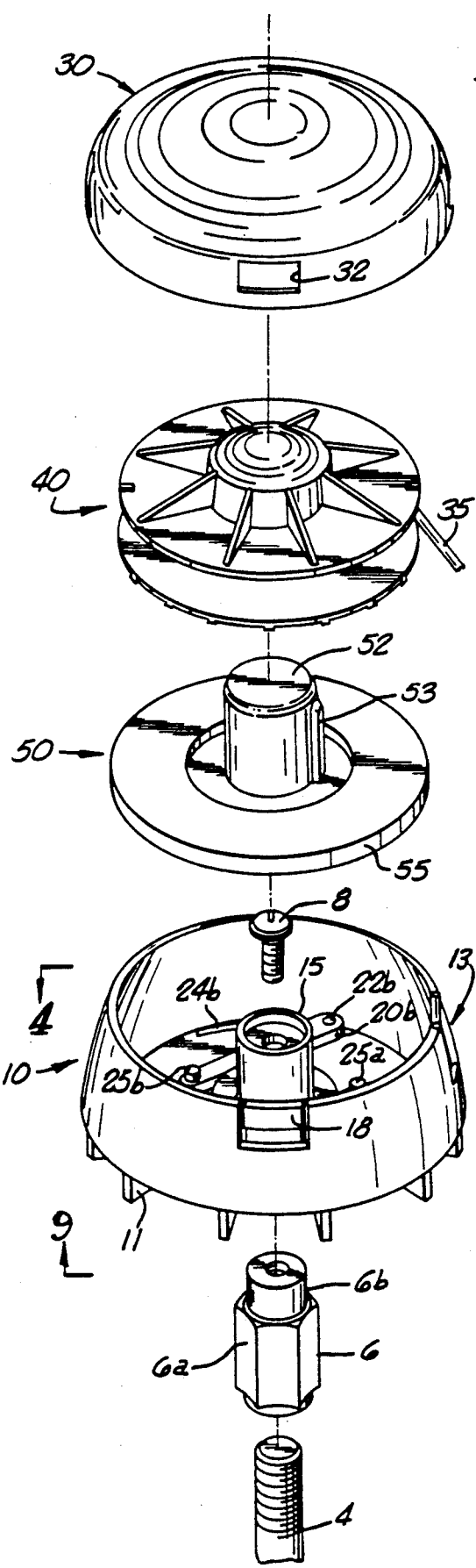
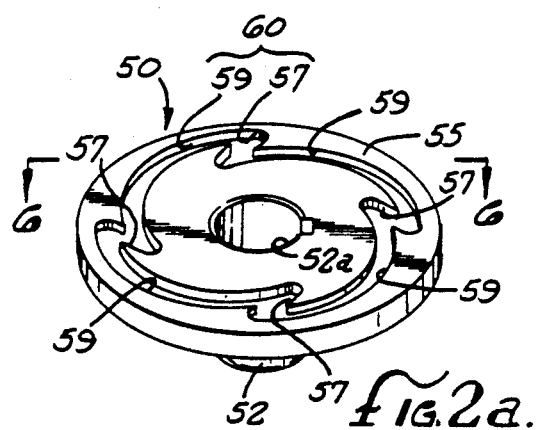
FIG.2.
FIG.2a.
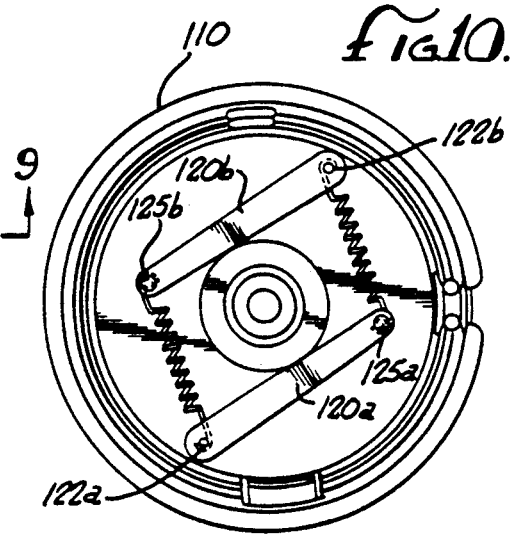
FIG.10.

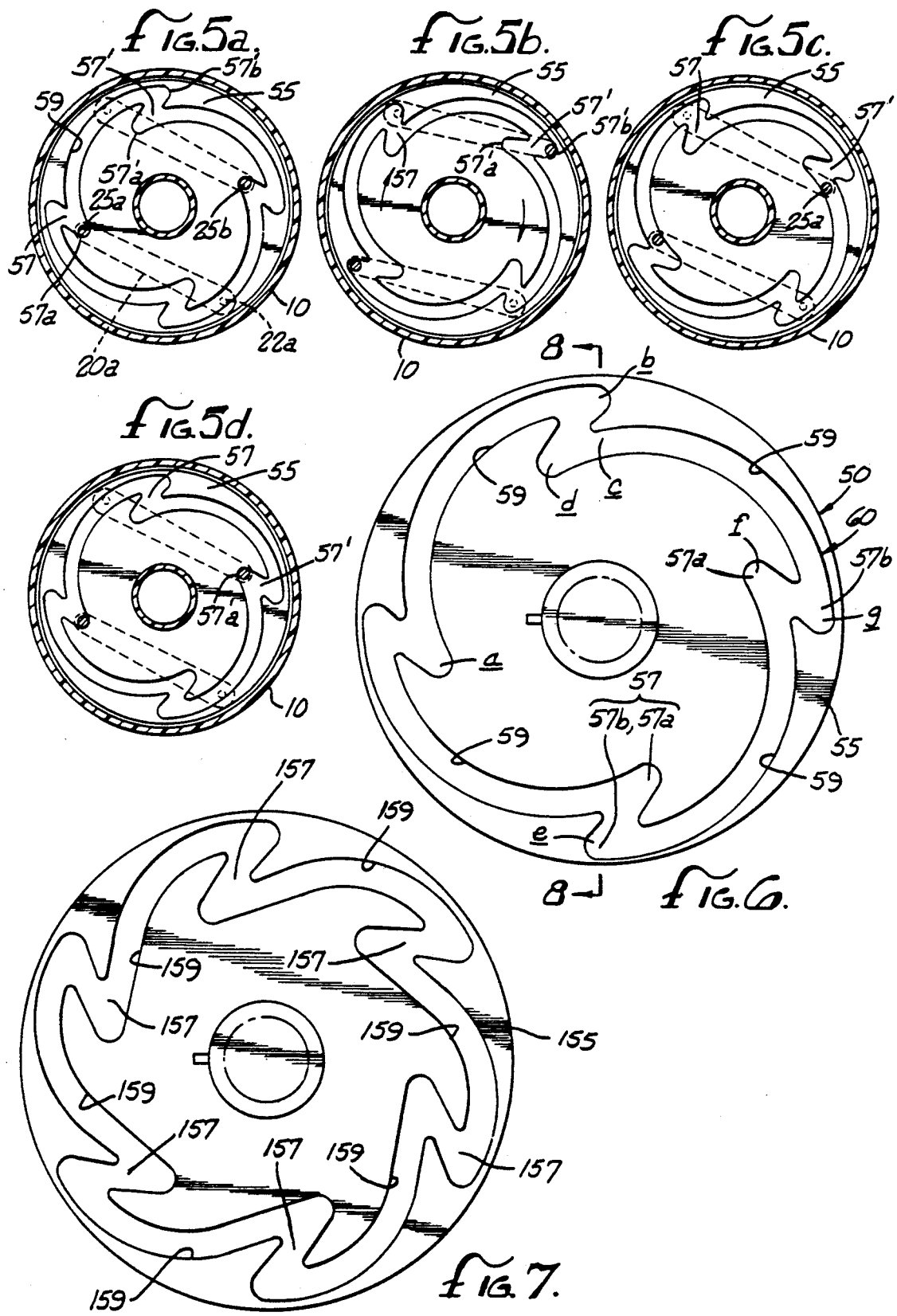

SEMI-AUTOMATIC STRING TRIMMER HEAD

CROSS-REFERENCE TO RELATED APPLICATION

This application is a continuation of U.S. application Ser. No. 222,652 filed on July 21, 1988, now U.S. Pat. No. 4,926,557.

BACKGROUND OF THE INVENTION

The field of the present invention relates to string trimmer devices. A string trimmer is a rotary mowing device using a flexible filament as a cutting mechanism. A string trimmer typically uses a plastic filament line mounted on a spool and rotated through a drive means to create the cutting action. When breakage or wear of the line occurs through impact with objects, fatigue or the like, additional filament needs to be unwound from the spool to replace the lost portion. For efficient use of filament, it is generally desirable that only a given amount of line be unwound when required.

Early generation string trimmers had to be stopped to permit manual extension of line to replace the broken portion. Such a procedure was inefficient and undesirable. One approach for automatic feed is the "bump feed" mechanism such as disclosed in Proulx, U.S. Pat. No. 4,103,212 or as in Oberg, U.S. Pat. No. 4,524,515. The Oberg device includes a driven member with a spool insertable therein. Ratchet means are included on the driven member and the spool, and spacing is provided between the driven member and the spool to allow for axial displacement of the spool to engage and disengage the ratchet means. When a ground engaging hub is contacted with the ground, the spool is axially displaced disengaging the spool, allowing it to rotate thereby unwinding a length of line therefrom. The bump feed trimmer requires the spool and the ground contacting hub to be axially displaceable and the operator must "bump" the head of the trimmer hard enough to cause the axial displacement. Bumping the trimmer on the ground could damage the trimmer especially if the operator applies a greater "bump" than that needed to release additional line.

Other devices accomplish the line metering operation by stopping of the trimmer. One such device is disclosed in Foster, U.S. Pat. No. 4,426,780. The Foster device indexes out a length of line whenever the motor is disengaged (such as by turning it off) whereby the driven portion (which includes the spool of line) overruns the driving portion. The Foster device depends on a relation that the driving portion connected to the motor would experience greater drag than the driven portion upon stopping allowing the driving portion to be overrun. Such an overrunning device may have difficulties in accurately indexing out a certain length or require a complicated mechanism to control the indexing.

It is therefore desirable to have a string trimmer with automatic feed of alternate design, preferably one with a minimum of moving parts.

SUMMARY OF THE INVENTION

The present invention is directed to a string trimmer head which provides an incremental indexing of line when the head is stopped and started. The preferred embodiment of the string trimmer head includes a spool member within a body member, the spool member being coaxially positioned within the body member and being rotatable therewith. The spool member includes a grooved end face with a cam channel having at least one switchback and one arcuate segment. A connecting means attached to the body member includes a connector which runs within the cam channel. Upon starting the rotation, the connector runs along an arcuate segment of the cam channel (permitting relative rotation between the spool member and the body member thereby indexing a length of line) until contacting a switchback stopping point, the connector remaining in that position as long as the head keeps rotating. The connector is biased to move along the switchback and resets along the switchback upon stopping of rotation.

BRIEF DESCRIPTION OF THE DRAWING

FIG. 1 is a perspective view of a string trimmer head according to the present invention;

FIG. 2 is an exploded perspective view of a string trimmer head according to the present invention;

FIG. 2a is a perspective view of the cam piece as in FIG. 2 illustrating the opposite side thereof.

FIG. 5a is a cross-sectional view of the head of FIG. 3 taken along the line 5a—5a;

FIGS. 5b 5c and 5d are the same cross sectional view as FIG. 5a with the engaging means in sequential positions;

FIG. 6 is a diagrammatic plan view of the end fact of the spool in FIG. 2a as viewed along line 6—6 and showing a cam channel having four switchbacks;

FIG. 7 illustrates an alternative end face as in FIG. 6 with a cam channel having six switchbacks;

FIG. 8 is a cross sectional view of the end fact of FIG. 6 taken along the line 8—8;

FIG. 9 is a plan view of the head of FIG. 3 taken along line 9—9; and

FIG. 10 illustrates an alternative biasing embodiment of the engaging means similar to the engaging means of FIG. 4.

DETAILED DESCRIPTION OF THE PREFERRED EMBODIMENT

Figure 3:
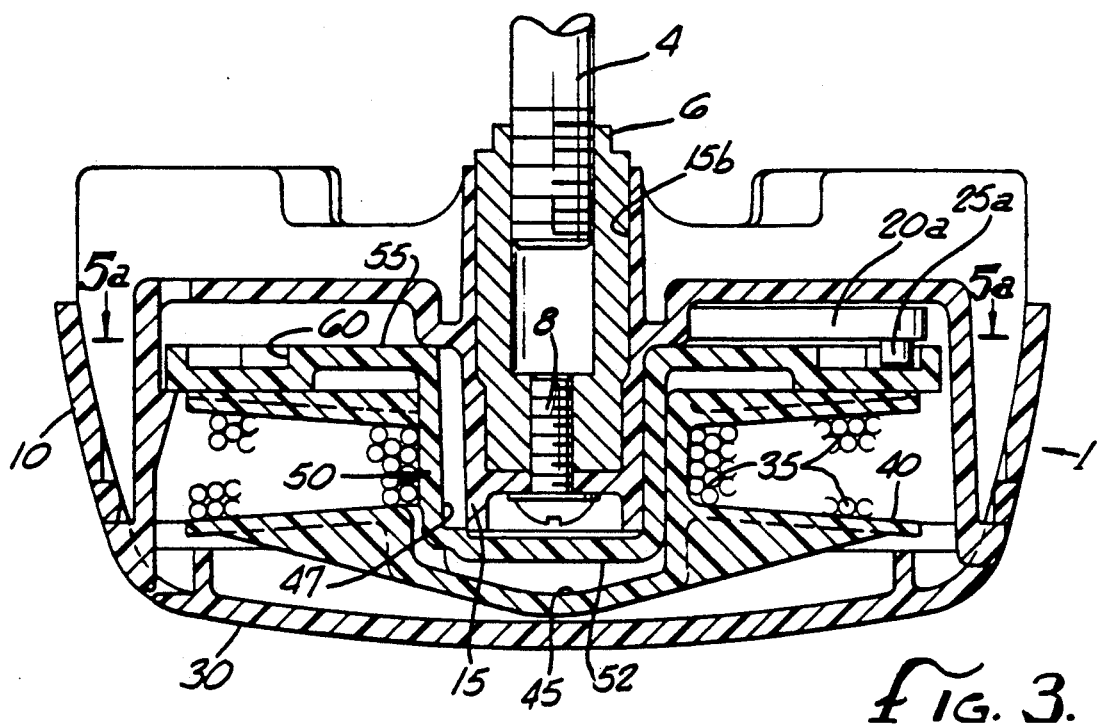
FIG. 3 is a cross sectional view of the head of FIG. 1 taken along the 3—3.

The preferred embodiment of the present invention will now be described with reference to the drawings. For convenience of description, any element represented by a numeral in one figure will be represented by the same numeral in any other figure.

FIG. 1 is a perspective view of a string trimmer head 1 according to the preferred embodiment of the present invention. The string trimmer head 1 includes a body member 10 and a cap member 30. Filament line 35 passes through exit port 13 in the side of the body member 10. A drive shaft 4 connects the body member 10 to a drive mechanism such as a motor (not shown).

FIG. 2 is an exploded perspective view of the string trimmer head if FIG. 1. The string trimmer head 1 includes the body member 10, the cap member 30, a spool member 40, and a cam piece 50. Filament line 35 is wound around the spool 40 thereby providing a supply of line for the string trimmer head 1. To assemble, once the line is wound about the spool 40, the spool 40 is placed over the cam piece 50, the spool 40 having a hollow inner cavity 45 (as shown in FIG. 3) to accommodate a protrusion 52 os the cam piece 50. The protrusion 52 has a key 53 which corresponds to a keyway 47 (as shown in FIG. 3) within the hollow inner cavity 45 of the spool 40. Once assembled with the key 53 within the keyway 47, the spool 40 and the cam piece 50 do not rotate relative to one another. The body member 10 has an inner core shaft 15 into a the hexagonal connector shaft 6 may be inserted and secured thereto by the screw 8. The hexagonal connector shaft 6 has a round portion 6b and hexagonal portion 6a, the hexagonal portion 6a fitting into and being accommodated by a hexagonal cavity 15b (as shown in FIGS. 3 and 9) within the core shaft 15. This hexagonal connection provides for a secure rotational connection between the motor shaft 4 and the body member 10.

To complete assembly, the cam piece 50 and spool 40 are placed over the core shaft 15 within the body member 10. The protrusion 52 of the cam piece 50 has an inner cavity 52a (as shown in FIG. 2a) which accepts the core shaft 15 as shown in FIG. 2. Adequate clearance is provided between the core shaft 15 and the cavity 52a to allow relative rotation therebetween.

To disassemble the string trimmer 1 from the assembled condition shown in FIG. 1, snap connector 18 is depressed out of a notch 32 permitting the removal of the cap member 30 and thereby allowing access to the interior of the body member 10.

FIG. 2a illustrates the cam piece 50 as in FIG. 2 with the cam piece 50 turned over to illustrate the end face 55. The end face 55 includes a cam channel 60 which is generally in a circular pattern about the end face 55. The cam channel 60 is comprised of a plurality of switchbacks 57 joined by an equal plurality of arcuate segments 59. As the cam piece 50 is placed into the body member 10, pins 25a and 25b engage the cam channel 60, thereby providing the rotational connection between the body member 10 and the spool 40. Details of the connectors will be described below.

FIG. 9 is a bottom plan view of the body member 10 of FIG. 2 as viewed along line 9—9. The motor side of the body member 10 has a plurality cooling fins extending radially outward from the center axis. The core 15 has a hexagonal portion 15a to accommodate the hexagonal portion 6a of the connector shaft 6 and a round portion 15b to accommodate the round portion 6b of the connector shaft 6. A center hole 15c accommodates the insertion of the screw 8.

FIG. 3 is a cross sectional view of FIG. 1 taken along the line 3—3. FIG. 3 shows the string trimmer head 1 with the cap member 30 snapped onto and attached to the body member 10. This spool 40 is connected to the cam piece 50 both of which are positioned within the body member 10. The spool member 40 and cam piece 50 are rotatable relative to the body member 10.

The body member 10 is attached to the connector shaft 6 by the screw 8 as previously described.

A connector arm member 20a is shown with its pin 25a engaging the cam channel 60 within the end face 55 of the cam piece 50. This engaging means provides the interconnection between the body member 10 and the spool 40 which allows relative rotation therebetween and the indexing out of a length of line 35.

Figure 4:
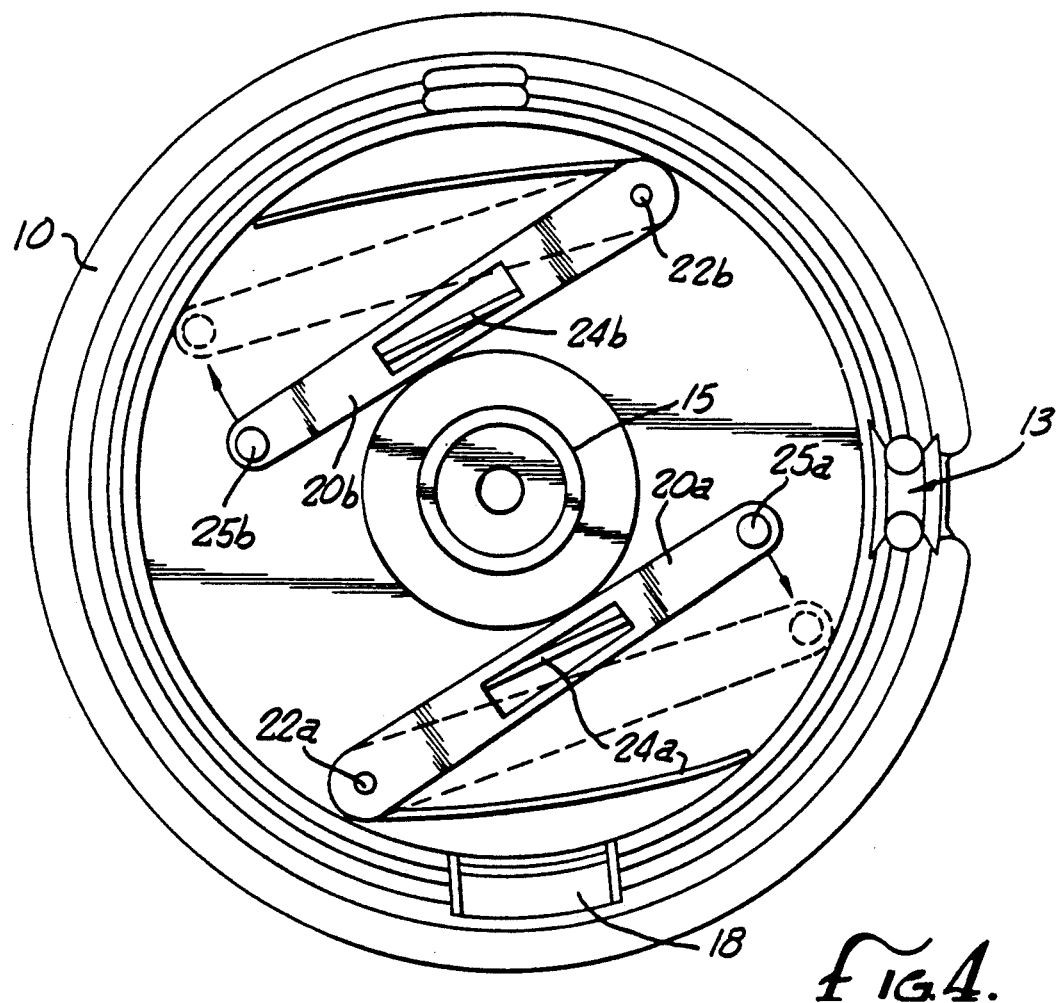
FIG. 4 is a detailed plan view of the engaging means of the body member in FIG. 2 as viewed along line 4—4.

FIG. 4 provides details of the engaging means. The preferred engaging means includes two arm member 20a and 20b to provide balance and reliability, but only one is functionally required. The arm member 20a is pivotally attached at a pivot point 22a at a first end thereof to the body member 10. The arm member 20a has a cam pin 25a on a second end thereof, for engaging the cam channel 60 as best shown in FIG. 3. The arm member 20a has a spring 24a biasing the second end of the arm member 20a radially inward. The configuration of the second arm member 20b with its corresponding pivot point 22b, cam pin 25b, and spring 24b is the same as that of arm member 20a described above.

The operation of the indexing mechanism will now be described with respect to FIGS. 5a-d and 6. The cam pin 25a meets with and moves along the arcuate segments 59 and the switchbacks 57 (which comprise the cam channel 60 as best viewed in FIG. 2a). Referring now to FIG. 6, each switchback 57 has a resting point 57a and a stopping or drive point 57b. This preferred embodiment will be described for a cam 50 of a trimmer head rotating in a clockwise direction as viewed in FIG. 6 and 5a-d. The cam pin 25a starts in its resting position at position a. As the body member 10 is rotated by the motor, the cam pin 25a will move along the arcuate segment 59 toward position b permitting relative rotation of the body member 10 to the spool 40 allowing indexing of line to occur. When the cam pin 25a reaches position b, relative rotation between the body number 10 and the spool 40 ceases and the spool 40 is driven along with the body member 10. Drive momentum and centrifugal force holds the cam pin 25a within the drive point 57b. when the drive mechanism is stopped, the driving force which holds the cam pin 25a within the drive point 57b ceases and the cam pin 25a drops down to position c due to the radially inward biasing provided by the spring 24a. The pin 25a may then slide further back to a resting position 57a at position d and await start-up and a subsequent indexing operation.

FIGS. 5a-d illustrate the same operation as described with respect to FIG. 6. When rotation is initiated, the cam pin 25a runs along an arcuate segment 59 until reaching the subsequent switchback 57' and fitting into the drive point 57'b as shown in FIG. 5b. Once the drive mechanism is stopped, the cam pin 25a (which is radially inwardly biased) is pulled down the switchback 57'a as shown in FIG. 5d.

As best shown in FIG. 6, the cam channel 60 comprising arcuate segments 59 and switchbacks 57 appears in a generally circular sawtooth shape along end fact 55. The cam channel 60 is in a plane perpendicular to the axis of rotation. An arcuate segment extends from the radially inward portion 57a of a switchback 57 to the radially outward portion 57b of the subsequent switchback. The switchback 57 is inclined to the radial direction to allow proper seating of a cam pin therewithin during drive rotation.

The length of the arcuate segment 59 determines the amount of line which is indexed out during each rotational start start-up. To achieve maximum indexing, an end fact 55 would be comprised of only one arcuate segment and one switchback. FIG. 6 illustrates an end fact 55 with four switchbacks 57 and four arcuate segments 59. FIG. 7 illustrates an alternate end fact 155 having six arcuate segments 159 and six switchbacks 157. The end fact 155 would provide a smaller quantity of line to be indexed out per rotational start-up.

Though the cam piece 50 and the spool member 40 are illustrated as separate components, they may be integrated into a single component. The cam piece 50 having the grooved end fact 55 is preferably a separate component. Different cam pieces may be installed for different trimmers. A large trimmer would include an end fact (such as the end fact 155 in FIG. 7) which indexes a large amount line. Similarly a small trimmer would include an end fact (such as end fact 55 in FIG. 6) which indexes a smaller amount of line. The remaining components may be the same and interchangeable for both sizes of trimmers reducing manufacturing costs while providing components for a wide size range of trimmers.

When the trimmer 1 has used up all its line 35, the cap member 30 is removed and the spool ember 40 is replaced with a new spool having a fresh supply of line. It is advantageous that the cam piece 50 with the grooved end fact 55 remains engaged and in place allowing convenient replacement of the spool 40.

FIG. 8 illustrates the cross-sectional view of the cam piece 50 of FIG. 6 taken along the line 8—8. FIG. 8 illustrates the depth of the cam channel in which the cam pin (see FIG. 3) slides as within the switchback stopping position 57b and the arcuate segment 50. A back side 53a of the key 53 of FIG. 2 is also visible in this figure.

FIG. 10 illustrates an alternate connecting means to that of FIG. 4. The connecting means is comprised of arm members 120a and 120b which are pivotally connected to the body member 110 at pivot points 122a and 122b. The cam pins 125a and 125b are placed on the opposite ends of the arm members 120a and 120b. Coiled springs 124a and 124b bias the opposite ends of the arm members 120a and 120b with the cam pins 125a and 125b in a radially inward direction.

Though a particular functional operation has been described with respect to the preferred embodiment, many other combinations effecting the same functional process disclosed are possible and envisioned. For example, referring to FIG. 6, if the cam piece 50 were the driving member, the driving member would be rotated in a counter-clockwise direction causing the cam pin to slide along the arcuate segment 50 causing the cam pin to slide along the arcuate segment 59 from the arcuate segment 50 from the resting position a to the drive position b. Upon stopping, the cam pin would be drawn radially inward to a position c and potentially slide back to a resting position d awaiting the next rotational start-up. In such an embodiment when describing the arcuate segments, the arcuate segment would extend from the inward portion 57a of one switchback 57 in a direction opposite the cutting rotation to the radially outward portion 57b of the next switchback 57.

Another possible alternative embodiment has the arm pins 25a and 25b biased radially outward. In the embodiment where the arm members 20a and 20b are connected to the body member 10, the cam pin resting position would be position e as in FIG. 6. Upon start-up with the rotation in a counterclockwise direction, the cam pin would travel from resting pint e along the arcuate segment 59 to a driving point f and upon stoppage the radially outward biased cam pin would slide toward position g awaiting another rotational start-up. It is believed that in light of the foregoing description and the drawings, other combinations would be apparent to one skilled in the art.

Thus a string trimmer with automatic feed has been disclosed. While embodiments and application of this invention have been shown and describe, it would be apparent to those skilled in the art that many more uses and modifications are possible without departing from the inventive concepts herein. The invention, therefore, is not to be restricted except in the spirit of the claims that follow.

What is claimed is:

1. A feed head for a string trimmer or the like, said feed head being rotationally drivable at a high speed about a center axis thereof and comprising:
    a hollow housing structure circumscribing said center axis and having a side wall portion with a line exit port therein;
    a spool member coaxially disposed within said housing structure for driven rotation therewith about said center axis, said spool member being adapted to hold a length of flexible cutting line with a free end portion of the line extending outwardly through said exit port to be whirled at high speed, in a cutting plane transverse to said center axis, in response to driven rotation of said feed head; and
    cooperating means on said housing structure and said spool member for creating a predetermined incremental relative rotation between said housing structure and said spool member about said center axis, in a manner correspondingly lengthening the free end portion of the line, in response to a driven rotational acceleration of said feed head about said center axis from a stopped condition.

2. The feed head of claim 1 wherein:
    said cooperating means include groove means formed in one of said housing structure and said spool member, and pin means carried by the other of said housing structure and said spool member, said pin means being received in said groove means for guided movement along their length.

3. A feed head for a string trimmer or the like comprising:
    a housing structure rotatable at high speed about a center axis thereof and having a generally radially facing side wall portion with a line exit port formed therethrough;
    line storage means, carried within said housing structure for rotation therewith, for storing within said housing structure a length of flexible cutting line having a free end portion extending outwardly through said line exit port to be whirled at high speed, in a cutting plane transverse to said center axis, during operative high speed rotation of said housing structure about said center axis; and
    line advancement means for automatically lengthening the free end portion of the cutting line, by a predetermined length increment, in response to rotational acceleration of said housing structure from a stopped condition thereof.

4. For use in conjunction with a string trimmer feed head or the like rotatable at high speed about a center axis thereof to whirl, in a cutting plane transverse to said center axis, an outwardly projecting free end portion of a quantity of flexible cutting line stored within the feed head, a method of periodically lengthening the free line end to compensate for shortening thereof during operation of the feed head, said method comprising the steps of:
    sensing a rotational acceleration of the feed head from a stopped condition thereof; and
    automatically causing a predetermined length of the stored line quantity to be paid out, to thereby add a corresponding length increment to the free line end portion, in response to the sensed rotational acceleration of the feed head from a stopped condition thereof.

* * * * *